(12) United States Patent
Kupferman

(10) Patent No.: US 7,075,746 B1
(45) Date of Patent: *Jul. 11, 2006

(54) DISK DRIVES AND DISK DRIVE CONTAINING DEVICES THAT INCLUDE A SERVO FREQUENCY GENERATOR AND SPINDLE CONTROL TIMER THAT COMPENSATE FOR DISK ECCENTRICITY

(75) Inventor: Hanan Kupferman, Diamond Bar, CA (US)

(73) Assignee: Western Digital Technologies, Inc., Lake Forest, CA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 11/093,506

(22) Filed: Mar. 30, 2005

(51) Int. Cl.
    *G11B 5/596* (2006.01)

(52) U.S. Cl. .................... 360/77.03; 360/77.08
(58) Field of Classification Search ............ None
    See application file for complete search history.

(56) References Cited

U.S. PATENT DOCUMENTS

| 5,477,103 A | * | 12/1995 | Romano et al. ............ 318/601 |
| 6,611,391 B1 | | 8/2003 | Murphy et al. |
| 6,972,540 B1 | * | 12/2005 | Wang et al. ................ 318/650 |
| 2003/0012101 A1 | * | 1/2003 | Park ........................ 369/47.48 |

* cited by examiner

*Primary Examiner*—Hoa T. Nguyen
*Assistant Examiner*—Mitchell Slavitt
(74) *Attorney, Agent, or Firm*—Young Law Firm

(57) ABSTRACT

A disk includes an actuator assembly, a spindle motor and a disk that defines a plurality of servo wedges. A wedge to wedge timer is configured to measure the time elapsed between at least two circumferentially adjacent servo wedges and to output a wedge to wedge correction signal that defines a count between circumferentially adjacent servo wedges that is dependent upon the measured elapsed time. A servo frequency generator is configured to output a servo frequency generator signal having a frequency that is modulated by the wedge to wedge correction signal. A spindle motor control timer outputs a spindle control timer signal that is dependent upon the servo frequency generator signal and upon the time elapsed between at least two successive detections of circumferentially adjacent servo wedges. A spindle motor controller controls the spindle motor with a control signal that changes according to the spindle control timer signal.

9 Claims, 3 Drawing Sheets

DISK DRIVES AND DISK DRIVE CONTAINING DEVICES THAT INCLUDE A SERVO FREQUENCY GENERATOR AND SPINDLE CONTROL TIMER THAT COMPENSATE FOR DISK ECCENTRICITY

BACKGROUND OF THE INVENTION

1. Field of the Invention

The present invention relates to disk drives. More particularly, the present invention relates to disk drives that are configured to compensate for disk eccentricity.

2. Description of the Prior Art

Disk drives, to varying extents, may suffer from a condition in which the disk or disks are not mounted at the exact center of rotation of the spindle motor. This condition manifests itself as a certain degree of eccentricity as the disk is rotated by the spindle motor. Such eccentricity may be caused by a condition called "disk slip" in which the disks slip relative to the clamp and/or spacers mounting the disks onto the spindle motor, which may occur as a result of a shock event occasioned by dropping or jarring the drive, for example. Alternatively, disk eccentricity may be caused, for example, by an inexact installation of a pre-recorded disk or disks (from a media writer, for example) on the drive's spindle motor. Some eccentricity is unavoidable, as the center opening of the disk must, by definition, be larger than the spindle of the spindle motor onto which it must be fitted.

When a disk or disks rotate with eccentricity, the result is once per revolution (OPR) timing errors, also referred to as a "big run-out". In contemporary drives, servo sectors of servo information are interspersed with data sectors circumferentially in concentric tracks around the recording surface or surfaces of the disk or disks. The format of the tracks calls for regularly spaced embedded servo sectors (also called servo wedges) containing servo information therein. Between the embedded servo sectors are a number of data sectors, which are configured to store user data. When a disk rotates with eccentricity, the wedge-to-wedge timing (as determined by the timing of circumferentially adjacent Servo Sync Mark (SSM) signals) will be modulated by the OPR timing error as the disk rotates, with the timing error being worse toward the inner diameter (ID) of the disk. This variation in the wedge-to-wedge timing due to disk eccentricity manifests itself as a certain degree of variation in the apparent linear velocity of the disk relative to the read/write transducers and causes a certain degree of uncertainty in the timing of the servo control signals and the placement of user data. This timing uncertainty must be accounted for in the allocation of the various fields and the gaps interspersed between the data fields, which results in a loss of format efficiency, as compared to a situation in which such timing uncertainty were minimized.

In order to develop a tighter speed control, the time interval between successive circumferentially adjacent SSMs may be measured to determine the "correctness" of the velocity of the disk (in counts per wedge). By feeding a clock to a counter, such as a wedge-to-wedge timer and comparing this feedback to an expected value, the resulting error may be taken as an indication of the necessary correction. However, such a method is not optimal in the presence of eccentricity, when the SSMs timing intervals are modulated by OPR timing errors caused by the changes to the apparent linear velocity of the disk for different areas of the track.

From the foregoing, it may be appreciated that methods for reducing the effects of disk eccentricity are needed.

SUMMARY OF THE INVENTION

According to an embodiment thereof, the present invention is a disk drive, comprising: an actuator assembly having a read/write head; a spindle motor; a disk mounted for rotation on the spindle motor and including a recording surface having a plurality of tracks, each track including a plurality of servo wedges; a wedge to wedge timer configured to measure a time elapsed between at least two successive detections of circumferentially adjacent servo wedges and to output a wedge to wedge correction signal that is dependent upon the measured elapsed time; a servo frequency generator configured to output a servo frequency generator signal having a frequency that is modulated by the wedge to wedge correction signal; a spindle motor control timer configured to output a spindle control timer signal that defines a count between circumferentially adjacent servo wedges that is dependent upon the servo frequency generator signal and upon the time elapsed between at least two successive detections of circumferentially adjacent servo wedges, and a spindle motor controller for controlling the spindle motor with a control signal that changes according to the spindle control timer signal.

The spindle motor may be configured to rotate at a desired rate that is independent of the count of the spindle control timer signal between circumferentially adjacent servo wedges. The spindle motor controller may be configured to change the control signal according to the count of the spindle control timer signal.

According to another embodiment thereof, the present invention is also a method for compensating for a once per revolution timing error in a disk drive having a spindle motor that rotates a disk, the method comprising the steps of: rotating the disk, and while the disk is rotating: measuring a wedge to wedge timing between at least two circumferentially adjacent servo wedges on a recording surface of the disk and outputting a wedge to wedge correction signal that is dependent upon the measured elapsed time; generating a servo frequency signal that is modulated by the wedge to wedge correction signal; generating a spindle control timer signal that defines a count between circumferentially adjacent servo wedges that is dependent upon the servo frequency generator signal and upon the wedge to wedge timing between at least two circumferentially adjacent servo wedges, and controlling the spindle motor with a control signal that changes according to the spindle control timer signal.

The rotating step may rotate the disk at a desired rate that is independent of a count of the spindle control timer signal between circumferentially adjacent servo wedges. The control signal in the controlling step may be configured to change according to the count of the spindle control timer signal.

The present invention, according to still another embodiment thereof, may be viewed as a mobile host device, comprising: an enclosure; a disk drive coupled to the enclosure, the disk drive including: an actuator assembly having a read/write head; a spindle motor; a disk mounted for rotation on the spindle motor and including a recording surface having a plurality of tracks, each track including a plurality of servo wedges; a wedge to wedge timer configured to measure a time elapsed between at least two successive detections of circumferentially adjacent servo wedges and to output a wedge to wedge correction signal that is dependent upon the measured elapsed time; a servo frequency generator configured to output a servo frequency generator signal having a frequency that is modulated by the wedge to wedge correction signal; a spindle control timer configured to output a spindle control timer signal that defines a count between circumferentially adjacent servo wedges that is dependent upon the servo frequency generator signal and upon the time elapsed between at least two successive detections of circumferentially adjacent servo wedges, and a spindle motor controller for controlling the spindle motor with a control signal that changes according to the spindle control timer signal.

The spindle motor may be configured to rotate at a desired rate that is independent of the count of the spindle control timer signal between circumferentially adjacent servo wedges. The spindle motor controller may be configured to change the control signal according to the count of the spindle control timer signal.

DESCRIPTION OF THE PREFERRED EMBODIMENTS

Figure 1:
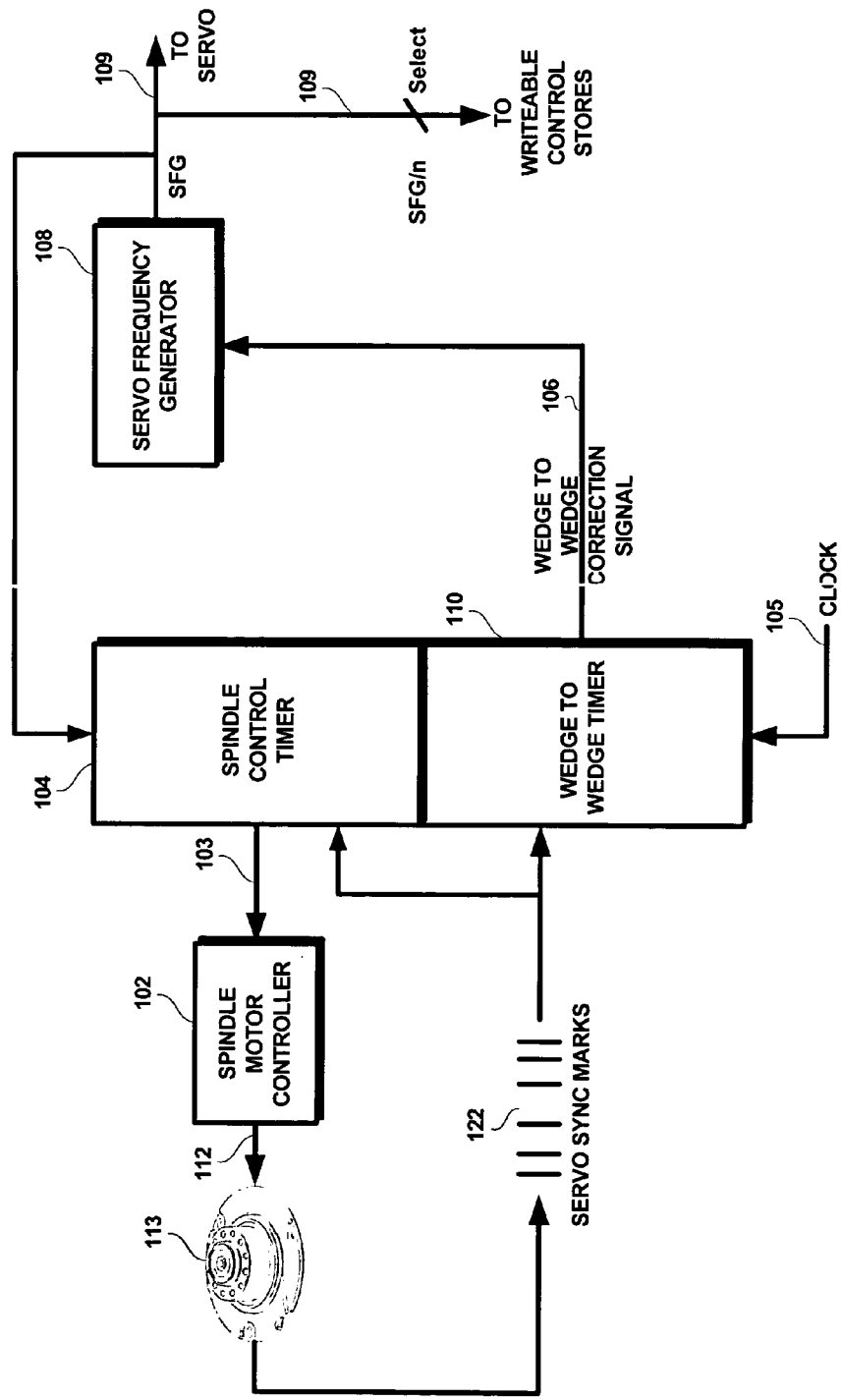
FIG. 1 is a block diagram of a control circuit for controlling the spindle motor controller under eccentricity according to an embodiment of the present invention.

FIG. 1 is a block diagram of a control circuit for controlling the spindle motor controller under eccentricity, according to an embodiment of the present invention. As shown therein, a spindle motor 113 rotates under the control of spindle motor controller 102. As the disk rotates under the read/write head(s) of the actuator assembly (shown in FIG. 2), the embedded Servo Sync Marks (SSMs) are detected, as suggested at 122. As also suggested by reference numeral 122, the detected servo sync marks, due to the eccentricity of the disk(s), are not detected at precisely regular intervals. Due to the apparent change in linear velocity of the surface of the recording surface of the rotating disk caused by such eccentricity, the timing of these servo sync marks varies in a generally sinusoidal fashion (i.e., once per revolution of the disk or disks).

According to an embodiment of the present invention, the SSMs are detected and fed to both the spindle control timer 104 and to the wedge to wedge timer 110. The timing variations between successive SSMs are detected and measured by the wedge to wedge timer 110. The wedge to wedge timer 110 generates a wedge to wedge correction signal 106. For example, two registers internal to the wedge to wedge timer 110 may be used to measure differences in successive detections of SSMs on the recording surface of the rotating disk to determine the wedge to wedge timing error. The wedge to wedge correction signal 106 changes according to the apparent changes in the linear velocity of the recording surface of the disk 200 (one such disk 200 being shown in FIG. 2) relative to the head stack assembly 150. As shown in FIG. 1, the wedge to wedge correction signal 106 may be fed to the servo frequency generator 108. The wedge to wedge correction signal 106, according to an embodiment of the present invention, modifies the servo frequency generator (SFG) output signal 109 of the servo frequency generator 108. The servo frequency generator signal 109 output from the servo frequency generator 108, modulated by the wedge to wedge correction signal 106, and selectively divided, may also be selectively fed to the servo Writeable Control Stores (WCS) (and to other functional blocks as well, as necessary), as shown in FIG. 1.

The spindle motor controller 102 may operate in first and second modes. Initially, upon spin-up, the spindle motor may be controlled to operate in the first mode and lock to the back emf of the spindle motor until it reaches its nominal rotational speed. When the spindle motor 113 is rotating at its nominal rotational speed and servo lock-up takes place, the spindle motor 113, under the control of the spindle motor controller 102, locks to the frequency of the servo sync marks by using the a spindle control timer signal 103 output from the spindle control timer 104. By feeding the servo frequency generator signal 109 (whose frequency is modulated by the wedge to wedge correction signal 106) back to the spindle control timer 104, the count of the spindle control timer signal 103 between circumferentially adjacent servo wedges output from the spindle control timer 104 is dependent upon the servo frequency generator signal 109. For example, the count of the spindle control timer signal 103 may be dependant upon the frequency of the servo frequency generator signal 109. In this manner, the spindle motor controller 102 may control the spindle motor 113 with a control signal 112 that changes according to the count of the spindle control timer signal 103 between circumferentially adjacent servo wedges. For example, the control signal 112 may change according to the count of the spindle control timer signal 103. According to an embodiment of the present invention, the servo frequency generator signal 109 is modified and essentially follows the changes in the apparent linear velocity of the disk relative to the read/write transducers of the head stack assembly, as detected through measured changes in the intervals between circumferentially adjacent SSMs. This servo frequency generator signal 109 is fed back to the spindle control timer 104, to cause it to output a spindle control timer signal 103 having a count that follows these variations in the SSM timing intervals. In turn, the spindle motor controller 102 is able to control the spindle motor 113 to a predetermined RPM with a control signal 112 that changes according to the changes in the frequency of the modulated servo frequency generator signal 109. In this manner, the servo frequency generator signal 109 may be used as an adaptive reference for spindle control, in that when the interval between circumferentially adjacent SSMs is relatively long, the servo frequency generator signal 109 will have a frequency that is relatively slower than when the interval between circumferentially adjacent SSMs are comparatively shorter. The control signal 112 fed to the spindle motor 113, therefore, is configured to maintain a constant count between circumferentially adjacent SSMs, but the frequency of the control signal 112 will be modulated according to the changes to the apparent linear velocity of the disk caused by eccentricity. It is to be noted that the rate at which the spindle motor rotates is independent of the count of the spindle control timer signal between circumferentially adjacent SSMs. Indeed, it is the count of the control signal 112 output from the spindle motor controller 102 that changes according to the modulated servo frequency generator signal 109, and not the rotational speed of the spindle motor 113.

Figure 2:
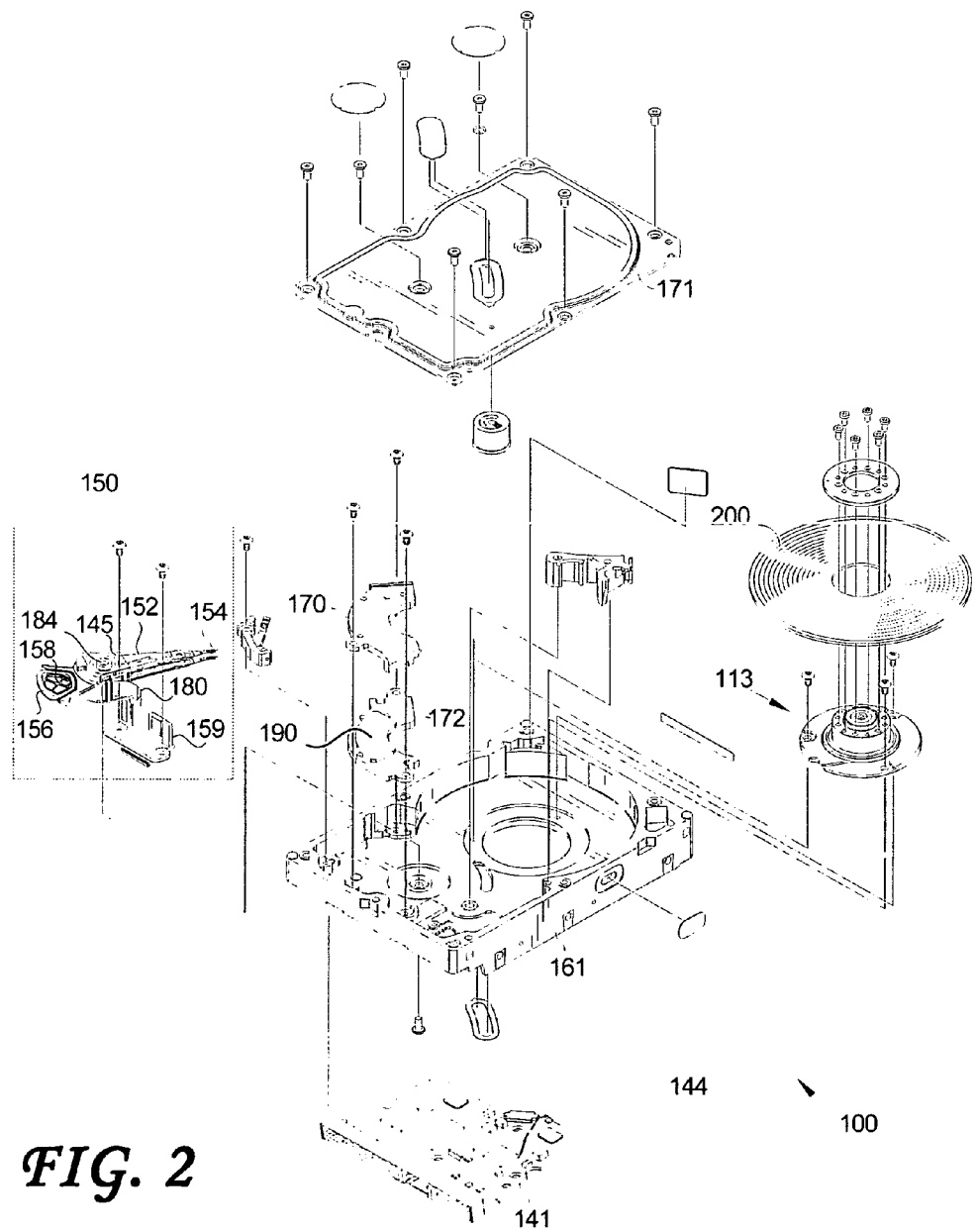
FIG. 2 is an exploded view of a disk drive incorporating the control circuit of FIG. 1, according to an embodiment of the present invention.
Figure 3:
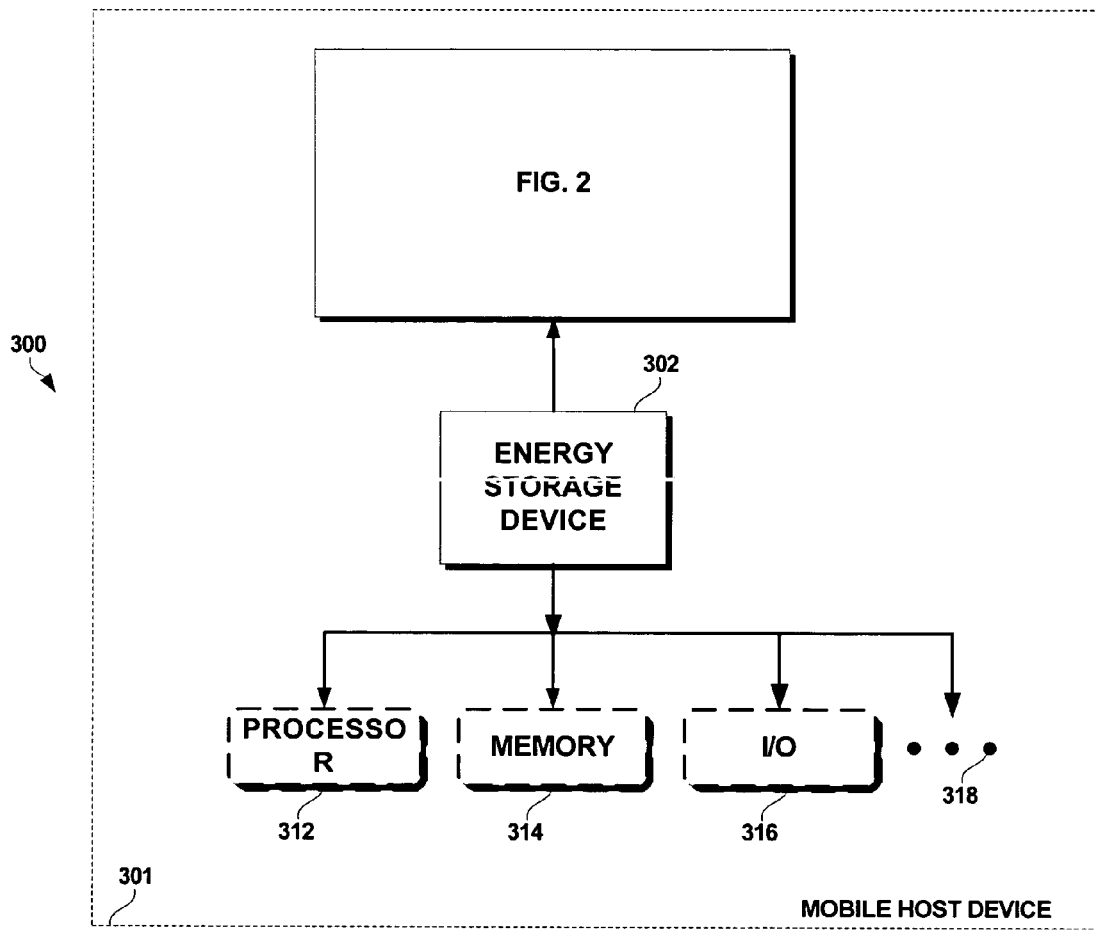
FIG. 3 is a block diagram of a mobile host device incorporating a disk drive constructed and configured to operate in accordance with an embodiment of the present invention.

FIG. 2 shows the principal components of a magnetic disk drive 100 according to an embodiment of the present invention. With reference to FIG. 2, the disk drive 100 comprises a head disk assembly (HDA) 144 and a printed circuit board assembly (PCBA) 141. The elements shown and described in FIG. 1 may be at least partially incorporated within the PCBA 141, for example. The HDA 144 includes a base 161 and a cover 171 attached to the base 161 that collectively house one or more disks 200 (only one disk 200 is shown in FIG. 2), a spindle motor 113 attached to the base 161 for rotating the disk 200, a head stack assembly (HSA) 150, and a pivot bearing cartridge 184 that rotatably supports the HSA 150 on the base 161. The spindle motor 113 rotates the disk 200 at a constant angular velocity, subject to the above-described variations. The HSA 150 comprises a swing-type or rotary actuator assembly 152, at least one head gimbal assembly that includes the suspension assembly 154, a flex circuit cable assembly 180 and a flex bracket 159. The rotary actuator assembly 152 includes a body portion 145, at least one actuator arm cantilevered from the body portion 145, and a coil assembly including a coil 156 cantilevered from the body portion 145 in an opposite direction from the actuator arm(s). A bobbin 158 may be attached to the inner periphery of the coil assembly to stiffen the coil assembly. The actuator arm(s) support respective suspension assembly (ies) that, in turn, support the head that includes the read/write transducer(s) for reading and writing to the disk 200. The HSA 150 is pivotally secured to the base 161 via the pivot-bearing cartridge 184 so that the read/write transducer(s) at the distal end of the suspension assembly (ies) may be moved over the recording surface(s) of the disk(s) 200. The pivot-bearing cartridge 184 enables the HSA 150 to pivot about its pivot axis. The "rotary" or "swing-type" actuator assembly rotates on the pivot bearing cartridge 184 between limited positions, and the coil assembly that extends from one side of the body portion 145 interacts with one or more permanent magnets 190 mounted to back irons 170, 172 to form a voice coil motor (VCM). When a driving voltage is applied to the VCM, torque is developed that causes the HSA 150 to pivot about the actuator pivot axis and causes the read/write transducer(s) to sweep radially over the disk 900.

Advantageously, a disk drive constructed and operating according to an embodiment of the present invention may be incorporated into a mobile host device 300 (e.g., a camera, telephone, music player, PDA, and the like) whose constituent parts may draw electrical energy from an energy storage device 302, such as a battery, for example. The mobile host device may include, for example, a processor 312, memory 314, Input/Output devices 316 (display, speakers, etc.) and others, collectively referenced by numeral 318. These elements may be contained in an enclosure 301. According to an embodiment of the present invention, when the disk 200 or disks 200 are mounted with eccentricity on the spindle motor 113, or when the mobile host device 300 is subjected to a shock event that jars the disk(s) 200 away from the rotational center of the spindle motor 113, embodiments of the present invention may operate to prevent undue degradation in the operation of the contained disk drive by controlling the spindle motor 113 with a control signal 112 that changes according to the frequency of the spindle motor control timer signal that is itself configured to follow the variations in the SSM to SSM timing intervals caused by eccentricity, as shown and detailed herein. Such eccentricity may be caused by the disk or disks slipping relative to the clamp and/or spacers mounting the disk or disks onto the spindle motor, which may occur as a result of a shock event occasioned by dropping or jarring the disk drive containing mobile host device, an event which is believed to become increasingly common, given the ubiquity of disk drive containing personal digital devices.

What is claimed is:

1. A disk drive, comprising:
    an actuator assembly having a read/write head;
    a spindle motor;
    a disk mounted for rotation on the spindle motor and including a recording surface having a plurality of tracks, each track including a plurality of servo wedges;
    a wedge to wedge timer configured to measure a time elapsed between at least two successive detections of circumferentially adjacent servo wedges and to output a wedge to wedge correction signal that is dependent upon the measured elapsed time;
    a servo frequency generator configured to output a servo frequency generator signal having a frequency that is modulated by the wedge to wedge correction signal;
    a spindle motor control timer configured to output a spindle control timer signal that defines a count between circumferentially adjacent servo wedges that is dependent upon the servo frequency generator signal and upon the time elapsed between at least two successive detections of circumferentially adjacent servo wedges, and
    a spindle motor controller for controlling the spindle motor with a control signal that changes according to the count of the spindle control timer signal.

2. The disk drive of claim 1, wherein the spindle motor is configured to rotate at a desired rate that is independent of the count of the spindle control timer signal between circumferentially adjacent servo wedges.

3. The disk drive of claim 1, wherein the spindle motor controller is configured to change the control signal according to the count of the spindle control timer signal.

4. A method for compensating for a once per revolution timing error in a disk drive having a spindle motor that rotates a disk, the method comprising the steps of:
    rotating the disk, and while the disk is rotating:
        measuring a wedge to wedge timing between at least two circumferentially adjacent servo wedges on a recording surface of the disk and outputting a wedge to wedge correction signal that is dependent upon the measured elapsed time;
        generating a servo frequency signal that is modulated by the wedge to wedge correction signal;
        generating a spindle control timer signal that defines a count between circumferentially adjacent servo wedges that is dependent upon the servo frequency generator signal and upon the wedge to wedge timing between at least two circumferentially adjacent servo wedges, and
    controlling the spindle motor with a control signal that changes according to the count of the spindle control timer signal.

5. The method of claim 4, wherein the rotating step rotates the disk at a desired rate that is independent of the count of the spindle control timer signal between circumferentially adjacent servo wedges.

6. The method of claim 4, wherein the control signal in the controlling step is configured to change according to the count of the spindle control timer signal.

7. A mobile host device, comprising:
    an enclosure;
    a disk drive coupled to the enclosure, the disk drive including:
        an actuator assembly having a read/write head;
        a spindle motor;

a disk mounted for rotation on the spindle motor and including a recording surface having a plurality of tracks, each track including a plurality of servo wedges;

a wedge to wedge timer configured to measure a time elapsed between at least two successive detections of circumferentially adjacent servo wedges and to output a wedge to wedge correction signal that is dependent upon the measured elapsed time;

a servo frequency generator configured to output a servo frequency generator signal having a frequency that is modulated by the wedge to wedge correction signal;

a spindle control timer configured to output a spindle control timer signal that defines a count between circumferentially adjacent servo wedges that is dependent upon the servo frequency generator signal and upon the time elapsed between at least two successive detections of circumferentially adjacent servo wedges, and a spindle motor controller for controlling the spindle motor with a control signal that changes according to the count of the spindle control timer signal.

8. The mobile host device of claim 7, wherein the spindle motor is configured to rotate at a desired rate that is independent of the count of the spindle control timer signal between circumferentially adjacent servo wedges.

9. The mobile host of claim 7, wherein the spindle motor controller is configured to change the control signal according to the count of the spindle control timer signal.

* * * * *